United States Patent [19]
Mallick et al.

[11] Patent Number: 5,897,666
[45] Date of Patent: Apr. 27, 1999

[54] GENERATION OF UNIQUE ADDRESS ALIAS FOR MEMORY DISAMBIGUATION BUFFER TO AVOID FALSE COLLISIONS

[75] Inventors: Soummya Mallick; Robert Greg McDonald, both of Austin, Tex.

[73] Assignee: International Business Machines Corporation, Armonk, N.Y.

[21] Appl. No.: 08/762,791

[22] Filed: Dec. 9, 1996

[51] Int. Cl.⁶ .................................................. G06F 12/02
[52] U.S. Cl. .......................................... 711/217; 711/200
[58] Field of Search ................................... 711/120, 167, 711/205, 217; 395/800.23

[56] References Cited

U.S. PATENT DOCUMENTS

| | | | |
|---|---|---|---|
| 4,970,636 | 11/1990 | Snodgrass et al. | 364/518 |
| 5,142,515 | 8/1992 | McFerrin et al. | 369/32 |
| 5,265,235 | 11/1993 | Sindhu et al. | 711/120 |
| 5,479,627 | 12/1995 | Khalidi et al. | 711/205 |
| 5,524,263 | 6/1996 | Griffith et al. | 395/800.23 |
| 5,659,782 | 8/1997 | Senter et al. | 395/800.23 |
| 5,694,577 | 12/1997 | Kiyohara et al. | 711/167 |

*Primary Examiner*—Tod R. Swann
*Assistant Examiner*—David Langjahr
*Attorney, Agent, or Firm*—Jack V. Musgrove; Andrew J. Dillon

[57] ABSTRACT

A method and device for generating address aliases corresponding to memory locations, for avoiding false load/store collisions during memory disambiguation. The alias generator takes advantage of the fact that the entire address range will most likely not be active in the registers at any one time. The subset of the address range that is active can be represented with a smaller number of bits and, hence, the computation of true dependencies is greatly reduced. The address alias generator includes an array for receiving the memory addresses, comparators having inputs connected to each array entry and having outputs connected to an alias encoder, and a control logic unit for writing the given memory address in one of the entries. The output of a given gate is turned on if a memory address is the same as the contents of one of the entry corresponding to that output, and the control means is activated if the output of all of the gates are turned off. In the preferred embodiment, the memory addresses are 32-bit values, the array has 64 entries, and the encoder generates 6-bit values for the address aliases. The processor includes a memory disambiguation buffer for identifying load/store collisions, that uses the 6-bit address aliases.

20 Claims, 4 Drawing Sheets

GENERATION OF UNIQUE ADDRESS ALIAS FOR MEMORY DISAMBIGUATION BUFFER TO AVOID FALSE COLLISIONS

BACKGROUND

1. Field

The present disclosure generally relates to computer systems, and more particularly to superscalar computer processors in which "load" and "store" operations may be executed out of order. The present disclosure is directed to a method and device for providing address aliasing of memory locations that simplifies program operation by reducing the complexity of address comparisons that are required to check for load/store collisions.

2. Description of the Prior Art

A conventional computer has several different pieces of interconnected hardware which typically at least include (a) input/output devices such as keyboards and displays that provide a user interface, (b) a permanent memory (storage) device such as a magnetic or optical disk having program and data files, (c) a temporary (volatile) memory device such as random access memory (RAM) for holding portions of the program and data during program execution, and (d) the central processing unit (CPU), or processor, which accesses the storage device and RAM in carrying out the actual program instructions. When a computer program is written, it must be converted from human-readable source code to machine-readable object code that will run in the particular processor being used. When a program is so converted, or compiled, the resulting object code includes a multitude of "addresses" for various program instructions and data embedded in the code. These relative addresses are used by the processor to locate the instructions and data after the program has been loaded into RAM, i.e., to correlate the relative addresses to actual physical addresses in RAM.

Memory addressing can take on many forms. The simplest is absolute addressing (or direct addressing) where the address value corresponds exactly to the physical address. Another common technique is indexed addressing which requires addition of the relative address with an index, or offset, value. This technique allows a large number of program addresses to be mapped to a fixed number of physical memory locations, by dividing up the program into blocks or pages. In some memory addressing schemes, there is only one mapping function from the relative memory to physical memory, while other schemes use multiple address mappings.

Processors use various hardware registers to carry out an instruction set associated with a particular procedure, and to manipulate data. A register is "loaded" with a program instruction or data value by referring to the desired memory address of the instruction or value. Values in the registers can be "stored" at various memory locations either for temporary use during program execution or for ultimate copying to the permanent storage device. An actual memory address is binary, i.e., a series of 1's and 0's (bits). The number of bits in a memory address (its word size) depends upon the number of bits in the processor's registers, typically 8 bits, 16 bits or 32 bits.

The earliest computers allowed only sequential execution of load and store operations. In other words, a particular procedure would be executed one step at a time in accordance with the program flow set forth in the source code. Such processing ensures that there are no problems with memory dependencies. A memory dependency exists if a register is to be loaded from a particular memory location whose value (whether a program instruction or data) was set by a previous store operation.

Later computers (superscalar) were designed to optimize program performance by allowing load operations to occur out of order. Memory dependencies are handled by superscalar machines on the assumption that data be loaded is often independent of store operations. These processors maintain an address comparison buffer to determine if there is any potential memory dependency problem, or "collision." All of the store operation physical addresses are saved in this "store" buffer, and load operations are allowed to occur out of order. At completion time, the address for each load operation is checked against the contents of the store buffer for any older store operations with the same address (collisions). If there are no collisions, the instructions (both loads and stores) are allowed to complete. If there is a collision, the load instructions have received stale data and, hence, have to be redone. Since the corrupted load data may have been used by a dependent instruction, all instructions previous to the load instruction must be restarted, with a resulting degradation in performance.

Memory dependencies can be true or false if the mapping scheme creates ambiguities. A memory dependency is false if evaluation of the memory location for a load operation appears to be the same as that for the memory location of a prior store operation, but in actuality is not the same because the aliases point to different physical memory locations. Many processors, for example, ignore the upper 20 bits in a 32-bit address when checking for collisions, and sometimes further ignore the lowest one or more bits, in order to speed up processing. Since true memory dependencies are less frequent than true register dependencies, superscalar processors generally perform well, but they nevertheless suffer additional deterioration in performance due to false byte collisions. It would, therefore, be desirable to devise a method for simplifying the process of checking for collisions so as to enhance processor performance, and it would be further advantageous if such a method could also completely avoid false collisions.

SUMMARY

It is therefore one technical advantage to provide an improved method of checking for potential memory dependencies in a superscalar (out of order execution) processor.

It is another technical advantage to provide such a method which is easily scalable to procedure complexity.

It is yet another technical advantage to provide such a method which eliminates false byte collisions by providing accurate disambiguation of memory addresses.

The foregoing objects are achieved in a method generally comprising the steps of generating an address alias for each memory address of the procedure, loading the program instructions and data values into the registers, completing all program instructions in the procedure except those required to store the result values, and determining whether the address alias for any program instruction or data value is the same as an address alias for any physical memory location which is to store a result value prior to loading such program instruction or data value and, if so, then reloading all program instructions previous to the loading of such program instruction or data value and thereafter completing all program instructions sequentially but, if not, then storing the result values in the physical memory locations.

BRIEF DESCRIPTION OF THE DRAWINGS

The illustrative embodiment, further objectives and advantages thereof, will best be understood by reference to the following detailed description when read in conjunction with the accompanying drawings, wherein.

DETAILED DESCRIPTION

Figure 1:
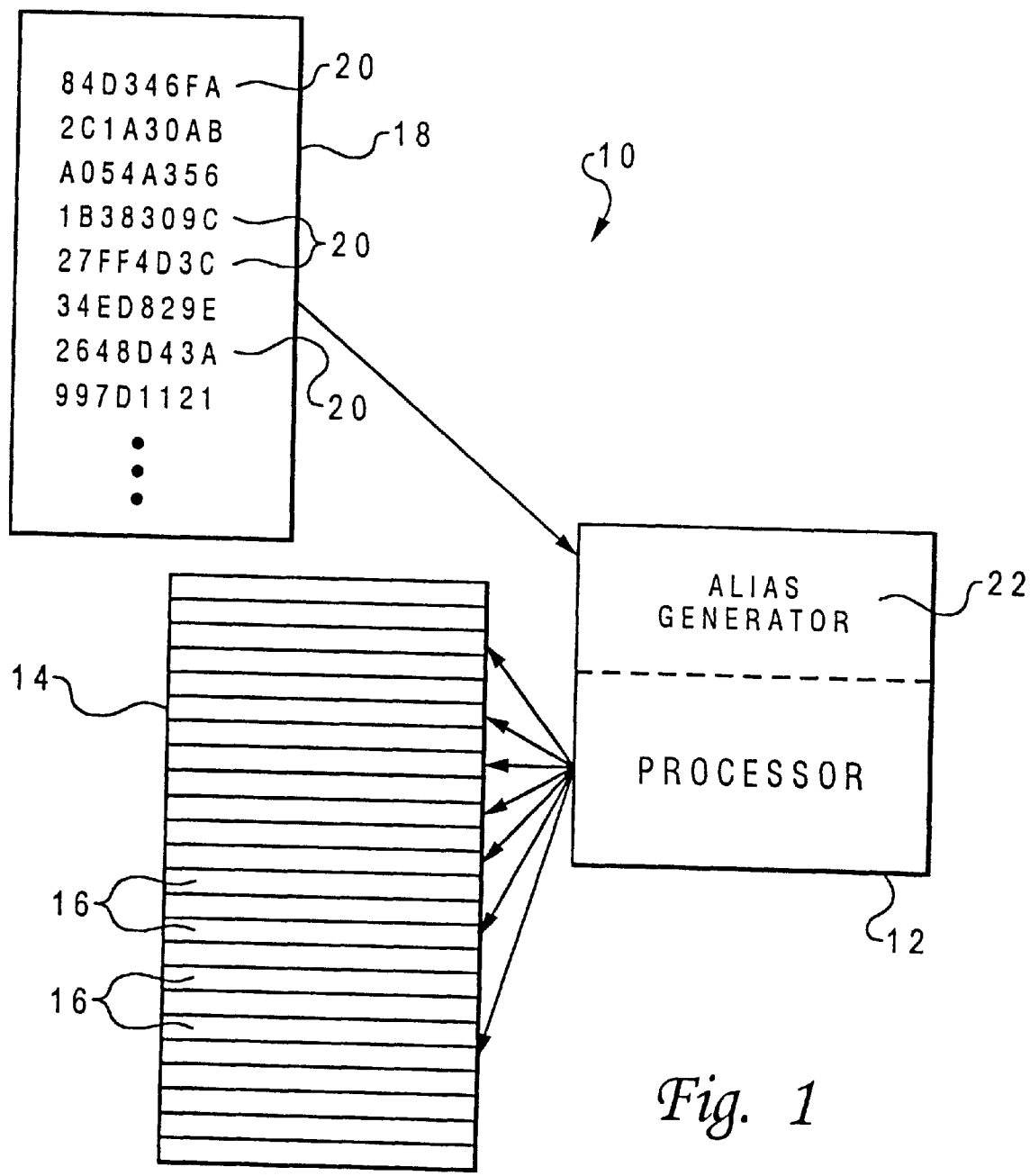
FIG. 1 is a symbolic representation of a method and device according to which a plurality of address aliases are generated, corresponding to memory addresses in a procedure, and the aliases are used to access physical memory locations.

With reference now to the figures, and in particular with reference to FIG. 1, there is depicted a symbolic representation of a computer system 10. System 10 is generally comprised of a processor 12 and a memory array 14 having a plurality of physical memory locations 16 which are accessed by processor 12. Processor 12 executes a procedure 18 associated with a computer program, which includes a plurality of program instructions and data values with corresponding memory addresses 20 (in the exemplary embodiment of FIG. 1, addresses 20 are 32-bit values expressed by eight hexadecimal digits). Addresses 20 are mapped to physical memory locations 16 by processor 12, such that computed values can be stored from the processor's registers into physical memory locations 16, and values from those locations can be loaded in the processor's registers.

The illustrative embodiment employs an address alias generation mechanism 22, connected to or incorporated within processor 12, which receives memory addresses 20 and converts them into address aliases for use by processor 12 and the memory disambiguation buffer (discussed below). In other words, when processor 12 executes a load or store operation, it uses the address alias rather than the 32-bit memory values 20. Alias generator 22 takes advantage of the fact that the entire address range (e.g., 32-bit) will most likely not be active in the registers at any one time. The subset of the address range that is active can be represented with a smaller number of bits and, hence, the computation of true dependencies is greatly reduced. For example, the hardware required to convert 32 bits to 6 bits and back from 6 bits to 32 bits will have a complexity which is a direct function of the number N of memory addresses, but the comparison required to check for collisions has a complexity which is a function of $N^2$. Therefore, reducing the number of bits required in the comparison process speeds up operation significantly more than the slowing effect resulting from the aliasing process of the present disclosure. This tradeoff is particularly beneficial when the total number of comparisons is large (see the discussion below regarding FIGS. 3 and 4).

In an exemplary embodiment, a 64-entry cache is used to return a 6-bit alias when indexed with a 32-bit address. The cache organization is direct-mapped to a fully associative form. In other words, each entry in the cache is directly associated with a specific alias. Other forms of cache organization can be used, such as set-associative. A table indexed by the 6-bit alias produces the 32-bit address. Every 32-bit address received (for every load/store operation) for a given procedure is used to access the "Address-to-alias" table, and if a valid alias is found, this is used as the temporary name of the load/store location. If the alias is found to be not valid, a new alias is allocated sequentially (from a free-running counter). This same alias is also used to index the "Alias-to-address" table to update the table with the physical address.

Processor 12 includes a memory disambiguation buffer which uses the address aliases to perform its compares for load/store collisions in the same manner that conventional store buffers perform address comparisons. Since the comparisons are performed on smaller-sized (6-bit) addresses, the memory dependency check is faster. When the 32-bit memory address is required for the load/store instruction, the "Alias-to-address" table is used to get the 32-bit address and store the data into memory. All load addresses for every procedure (say L) are checked against all store addresses for every other procedure (say S). Hence, the total number of 32-bit address comparisons that will have to be done is S*L*(N−1). The sizes of 32 bits and 6 bits for the addresses and aliases is exemplary, and should not be construed in a limiting sense.

Figure 2:
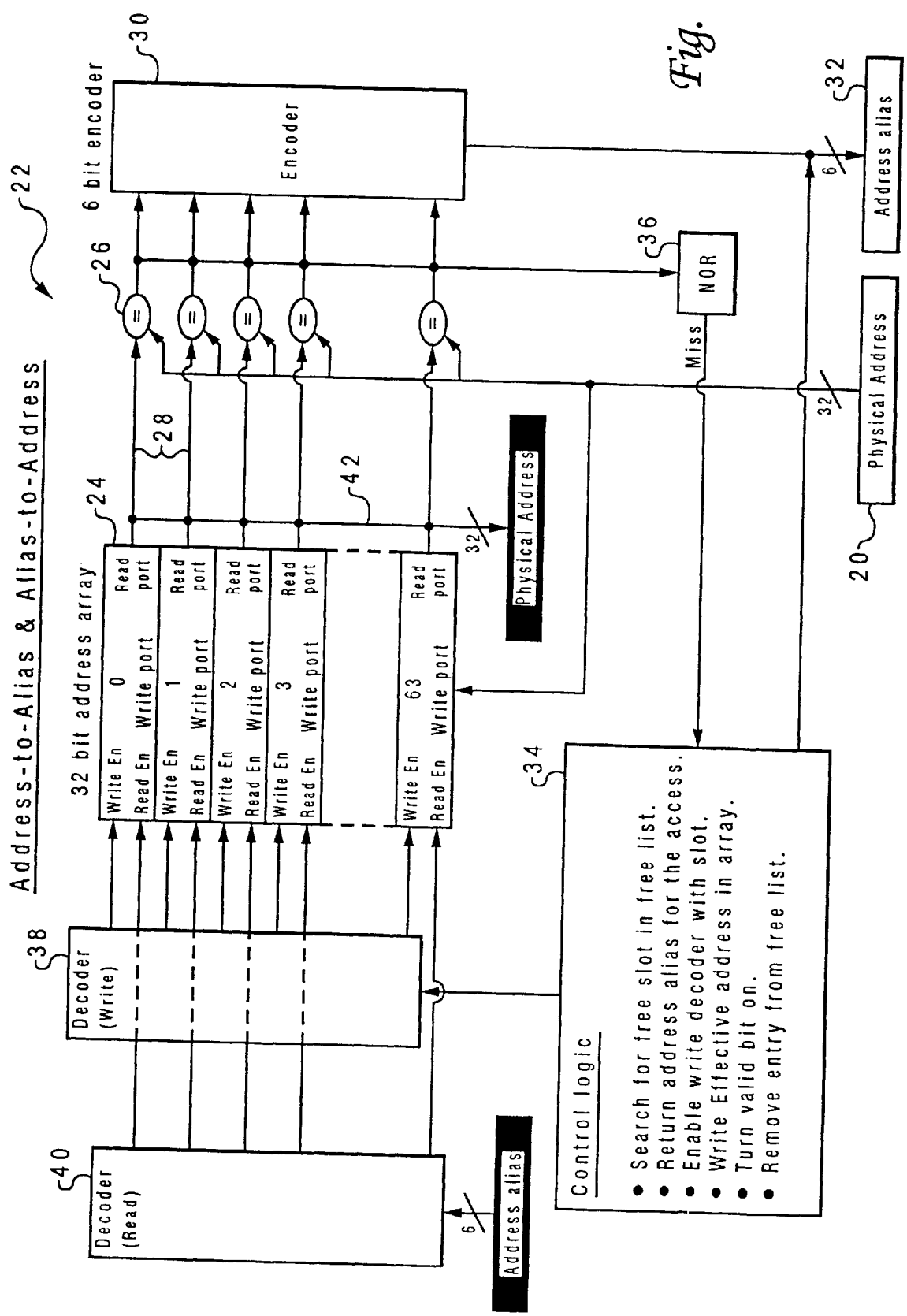
FIG. 2 is a schematic diagram of one embodiment of the address alias generator used in the method and device of FIG. 1.

FIG. 2 is a schematic diagram of one embodiment of a hardware implementation of address alias generator 22. When a relative memory address 20 (32-bit) is fed to processor 12 (for a load or store operation), it is intercepted by alias generator 22 and directed to an address array 24 (64-entries, each storing a 32-bit address and a "valid" bit) and to a series of comparator sets 26. The other input of each gate is connected to a respective output 28 of array 24 (the read ports for each of the entries). If the 32-bit memory address matches an entry in array 24 whose valid bit it turned on, then the corresponding comparator set 26 turns on its output to an alias encoder 30. Alias encoder 30 will then feed a 6-bit value 32 (address alias) to the processor registers and the memory disambiguation buffer, based on which comparator set 26 is turned on. Array 24 needs to store each alias only during its lifetime in the processor.

The 6-bit alias values are effectively assigned by a control logic unit 34. The outputs of comparator sets 26 are additionally connected to a NOR circuit 36 whose output is connected to control logic unit 34. If no valid match for an incoming 32-bit address is found in array 24 (i.e., all outputs of comparator sets 26 are turned off), then NOR circuit 36 turns on, prompting control logic unit 34 to search for an available slot in a "free" list of aliases (values 0–63, any entry whose valid bit is turned off). When one is found, the incoming 32-bit address is stored in the corresponding entry in array 24 via a write decoder 38 having outputs connected to the respective write enable inputs of array 24. Since the incoming 32-bit address is connected to the write port of array 24, activation of the appropriate output of write decoder 38 results in the address being stored in the corresponding entry in array 24, and its valid bit is turned on. The entry is also removed from the free list. Aliases can be allocated in groups (of say, 32), and only when one group has run out, are others allocated for the second group, etc., and the first or earlier groups can be reclaimed all at once (any such mechanism could be used). The foregoing circuits constitute the "Address-to-alias" table.

Thereafter, when processor 12 returns a 6-bit alias 32 as a result of processing, the alias value is input into a read decoder 40. The outputs of read decoder 40 are connected to the respective read enable inputs of array 24. The read ports of array 24 are also connected to an output bus 42. In this manner, the appropriate 32-bit address 20 is output based on the 6-bit input to read decoder 40. These components constitute the "Alias-to-address" table.

The foregoing construction for alias generator 22 may be achieved using various logic components and integrated circuitry, as will become apparent to those skilled in the art upon reference to this disclosure. This construction provides a faster method of checking for potential memory dependencies in a superscalar (out of order execution) processor. It is also easily scalable depending upon procedure complexity, and eliminates false byte collisions by inherently providing accurate disambiguation of memory addresses, since it uses the entire 32 bits in constructing the aliases.

Figure 3:
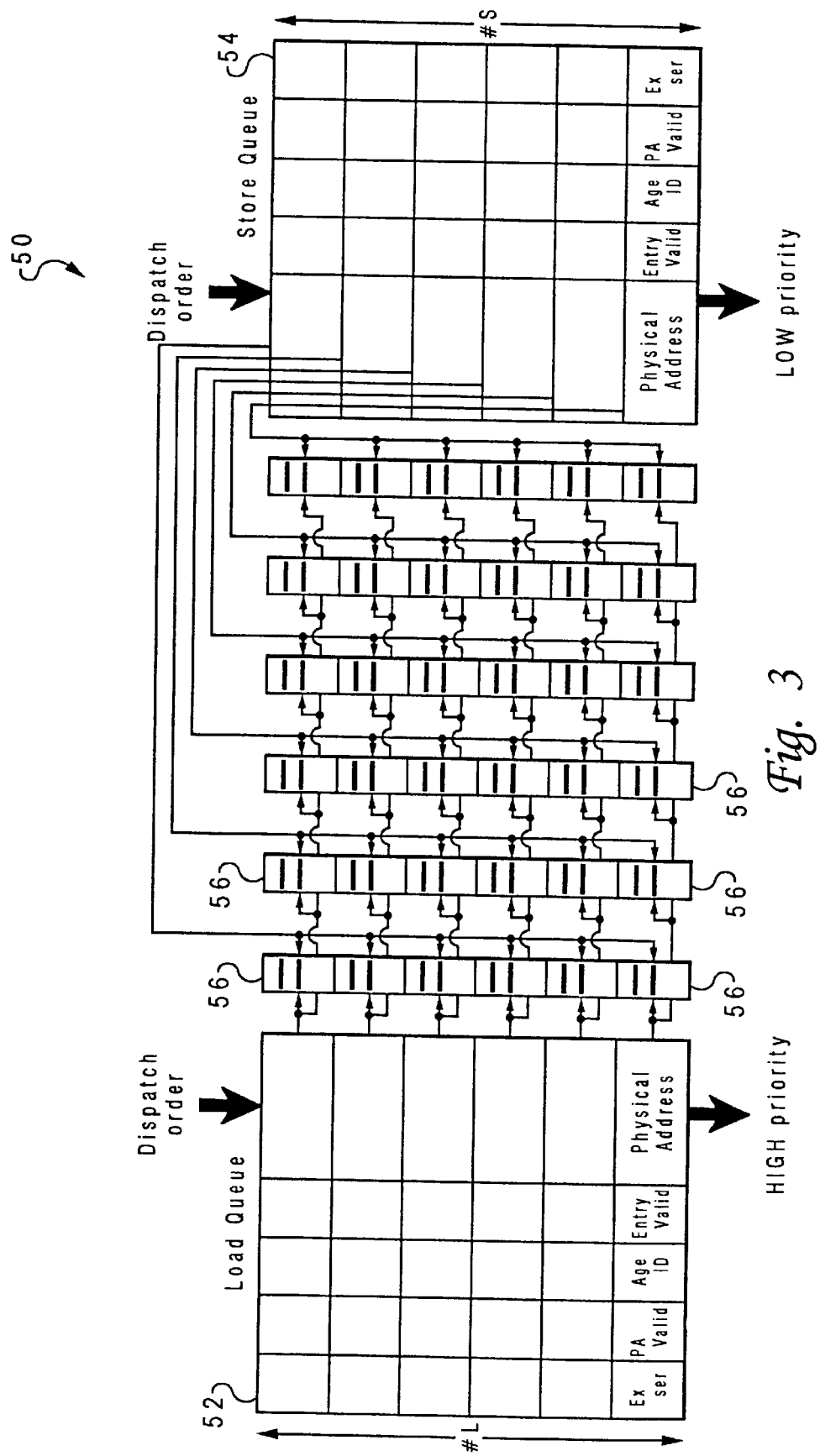
FIG. 3 is a schematic diagram depicting an address comparison circuit.
Figure 4:
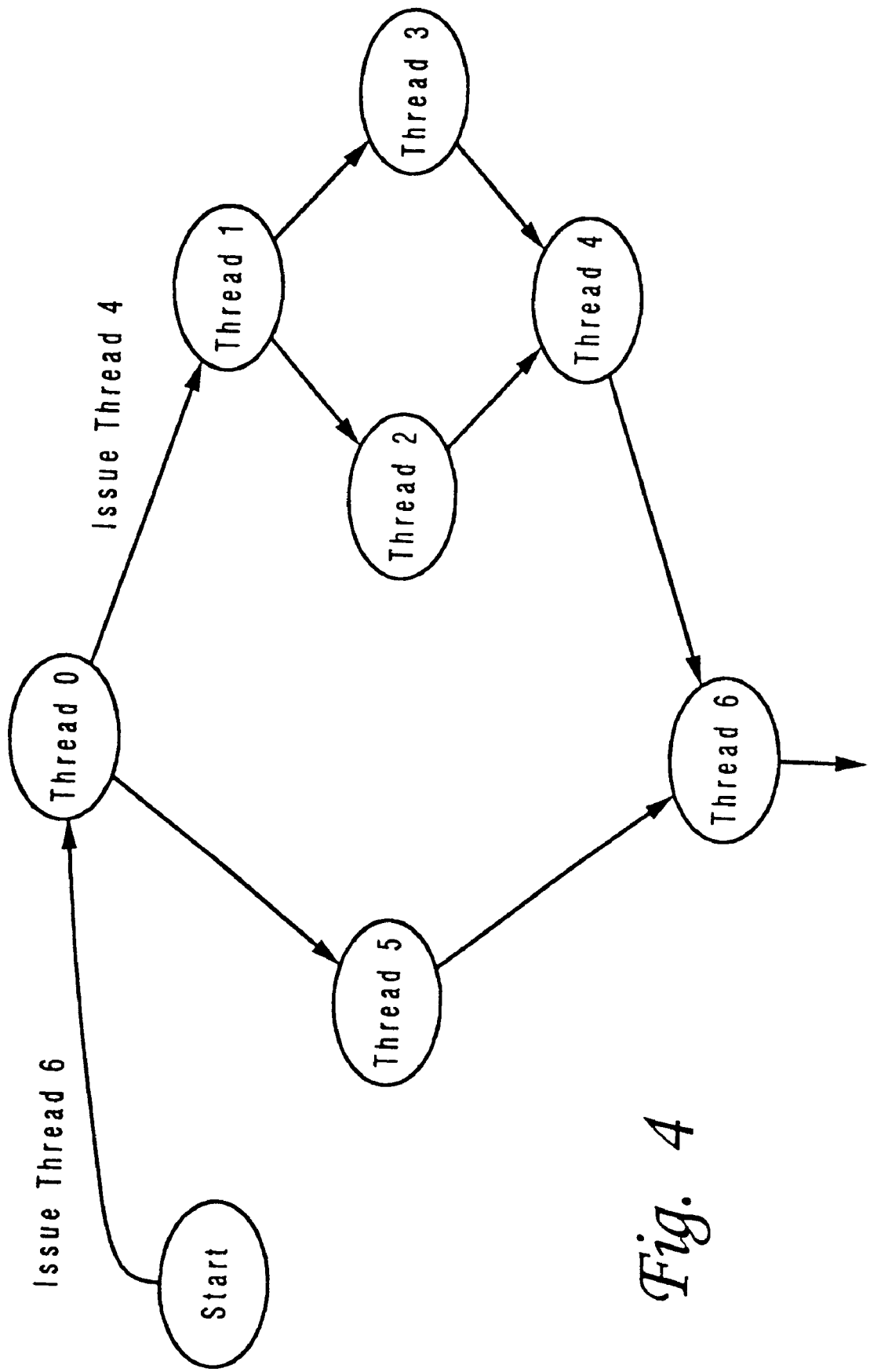
FIG. 4 is a diagram illustrating execution of a series of threads associated with a set of computer instructions.

FIGS. 3 and 4 are useful in understanding how the illustrative embodiment speeds up processing by reducing complexity of the address comparisons during checking for load/store collisions. FIG. 3 illustrates a generalized address comparison circuit 50 which is usable with either a prior art computer system or the exemplary embodiment 10 of FIG. 1. Address comparison circuit 50 includes a load queue 52, a store queue 54, and a plurality of individual comparator sets 56. Each of the load and store queues 52 and 54 have a plurality of fields, including a physical address field for storing the physical address of the memory cell to be accessed (or for storing the address alias as taught herein), an "entry valid" bit which is set when the address in that particular queue entry is valid, an "age ID" word which is indicative of the serialized order of the instruction corresponding to the physical address, a "physical address valid" bit which is set upon final computation of the physical address for that particular entry, and an "execution serialize" bit which is used as the flag to indicate a load/store collision. A given comparator set 56 has a first set of inputs connected to a given entry in load queue 52, and a second set of inputs connected to a given entry in store queue 54. In this manner, if any address in the "physical address" field of load queue 52 is equal to the physical address in "physical address" field of store queue 54, then the corresponding comparator output (not shown) will turn on, and the processor will, in response thereto, turn on the associated "execution serialize" bit (the collision flag). Comparison may be performed in two ways. First of all, if a new load instruction is added to load queue 52, that instruction can be checked against all older valid entries in store queue 54; conversely, if a new store instruction is added to store queue 54, that address can be checked against all newer valid entries in load queue 52. Those skilled in the art will appreciate that load queue 52 and store queue 54 could be combined, for example, by providing an additional field in each queue entry (a load/store bit).

If load/store instructions are placed in a given queue, one at a time, then the number of comparator sets 56 required for the comparison operation is equal to L+S−1, where L is the number of addresses for load instructions, and S is the number of addresses for store instructions. This construction is only viable where the relative sequence of instructions is known as each entry is placed in a queue. In other words, if the "age ID" field is known, then a smaller number of comparator sets may be used than the number shown in the matrix of FIG. 3. However, the "age ID" field is often unknown in superscalar computers wherein all of the instructions are placed in the queues at generally the same time. This may further be understood with reference to FIG. 4. FIG. 4 depicts an instruction set composed of multiple threads which can branch out conditionally to other threads. In the example of FIG. 4, thread 6 may be executed along one of three different paths (thread 0, thread 5 to thread 6; thread 0, thread 1, thread 2, thread 4 to thread 6; or thread 0, thread 1, thread 3, thread 4 to thread 6). When this set of instructions is processed, it begins with issuing an order for thread 6, since thread 6 is the ultimate exit point of the instruction set. In the further specific example wherein the particular data used results in the process following the branch from thread 0 to thread 1, the second issue order is for thread 4, since that thread is the ultimate exit point of the branch leading from thread 0 to thread 1. This out-of-order nature of instruction issuance (first issuing an order for thread 6, followed by an order for thread 4) prevents address comparison of load/store instructions on their way to the load or store queues. Instead, the comparison has to be done all at once at completion time (working in the processor's temporary space), at which time the "age ID" field for each entry in the queue will be known. Because of the requirement of checking all of the load addresses against all of the store addresses essentially simultaneously at completion time, it is necessary to provide an array of comparator sets 56 having dimensions L×S as shown in FIG. 3. Superscalar computers typically assume that L is approximately equal to S so the number of comparator sets required may be expressed as $N^2/4$, wherein $N=L+S=2L=2S$. Accordingly, the number of individual comparators that are required to fill out all of the comparator sets 56 is equal to the number of bits in the physical address multiplied by $N^2/4$. Therefore, for a prior art system which requires comparison of 32-bit addresses, the total number of individual comparators required is equal to $32 \times N^2/4 = 8N^2$. In contrast, the total number of individual comparators required according to the illustrative embodiment shown in FIG. 2, wherein the address alias is 6 bits, is equal to $6 \times N^2/4 = 1.5N^2$. Additional comparators are required to fill out the comparator sets 26 of FIG. 2, specifically, in an amount equal to the number of bits in the physical addresses (32) multiplied by N. However, since this number is a first-order function (of N), it becomes insignificant as N increases so that, for a very large N, the effective savings in the number of individual comparators used is equal to $(8N^2)/(1.5N^2)=5.3$, i.e., more than a fivefold reduction in the number of comparators. This reduction in the number of comparators not only simplifies the address comparison circuit 50, but also generally speeds up the comparison process.

We claim:

1. A method of handling program instructions in a superscalar processor, comprising the steps of:

in response to a first instruction specifying an address from which first information is to be loaded, generating an address alias, feeding said address alias to an address comparison circuit in association with said first instruction, and loading said first information from a memory location corresponding with said address to a first register of the processor;

in response to a second instruction specifying an address at which second information is to be stored, matching said address of said second instruction to said address of said first instruction, feeding said address alias to said address comparison circuit in association with said second instruction, and storing said second information from a second register of the processor to said memory location;

checking for a load/store collision between said first and second instructions using said address comparison circuit to determine that the same address alias is associated with said first and second instructions; and reloading said first information from said memory location in response to said determination that the same address alias is associated with said first and second instructions, wherein said address alias is uniquely indexed to said address during the lifetime of the first and second instructions in the processor such that said reloading step is performed only in response to a true load/store collision.

2. The method of claim 1 wherein said first instruction precedes said second instruction within a programmed sequence of instructions.

3. The method of claim 1 wherein said address has a first bit size and said address alias has a second bit size which is smaller than the first bit size.

4. The method of claim 1 wherein said address is written to an array and said generating step is performed by directly associating said address alias with a corresponding entry in the array.

5. The method of claim 1 wherein said step of storing said second information is accomplished by decoding said address alias to determine said address.

6. The method of claim 1 wherein said first instruction is one of a plurality of load instructions each having associated information which is to be loaded into respective load addresses, and further comprising the steps of:

generating a plurality of load address aliases corresponding respectively to said load addresses;

loading said associated information; and reloading at least a portion of said associated information in response to said address alias being equal to any of said load address aliases.

7. The method of claim 3 wherein said address is a 32-bit value and said address alias is a 6-bit value.

8. The method of claim 7 wherein the 32-bit value is stored in a 64-entry cache and said address alias is generated by associating the 6-bit value with a corresponding one of the respective entries in the cache.

9. A device for generating address aliases corresponding to respective memory addresses, comprising:

an array for receiving a first memory address in one of a plurality of entries, said first memory address containing first information which is to be loaded;

a comparator circuit for determining if a second memory address has already been written to one of said entries, said second memory address for receiving second information which is to be stored;

a control circuit for writing said second memory address in one of said entries if it is not equal to said first memory address; and an encoder circuit for generating an address alias based on the particular entry in said array which has received said second memory address, wherein said address alias is uniquely indexed to said second memory address during the lifetime of an associated instruction.

10. The device of claim 9 wherein:

said entries in said array can be valid or not valid; and said control circuit causes said second memory address to be written to a given one of said entries which is not valid, and thereafter causes said given entry to be switched to valid.

11. The device of claim 9 wherein:

said comparator circuit includes a plurality of comparators grouped in sets, a given set having inputs respectively connected to one of said entries of said array, each of said comparator sets further having an output connected to said encoder circuit, said output being turned on if said second memory address is the same as the contents of one of said entries corresponding to that output; and said control circuit is activated if the output of all of said comparator sets are turned off.

12. The device of claim 9 wherein:

said first and second memory addresses are 32-bit values;

said array has 64 entries; and said encoder circuit generates 6-bit values for said address aliases.

13. The device of claim 9 further comprising:

an output bus connected to said array; and a decoder circuit for selecting one of said entries to be connected to said output bus, said decoder circuit being responsive to an input which receives one of said address aliases.

14. The device of claim 9 wherein said array has a write port for receiving one of said memory addresses, and further comprising a decoder circuit for selecting one of said entries to be connected to said write port, said decoder circuit being responsive to said control circuit.

15. The device of claim 9 wherein each of the memory addresses has a first bit size, and said encoder circuit generates address aliases having a second bit size which is smaller than the first bit size.

16. A processor using the device of claim 9, the processor executing program instructions which store values in memory locations based on said address aliases, and further comprising a decoder circuit for outputting memory addresses associated with address aliases returned by the processor.

17. A processor using the device of claim 9, wherein:

said first information is associated with a first instruction and said second information is associated with a second instruction, and said first instruction precedes said second instruction within a programmed sequence of instructions; and said first information is loaded by the processor before said second information is stored but, if said first address is equal to said second address, said first information is reloaded by the processor after said second information is stored.

18. The processor of claim 16 wherein said program instructions include store operations for storing values in physical memory locations corresponding to the memory addresses, and load operations for loading values from physical memory locations corresponding to the memory addresses, and further comprising a memory disambiguation buffer circuit for identifying load/store collisions.

19. The processor of claim 18 wherein said memory disambiguation buffer circuit includes:

a buffer to hold each address alias for all memory addresses corresponding to any values which are to be stored in said physical memory locations; and a circuit for comparing each address alias for all memory addresses corresponding to any values which are to be loaded from said physical memory locations with the contents of said buffer.

20. The processor of claim 18 wherein said memory disambiguation buffer circuit includes:

a buffer to hold each address alias for all memory addresses corresponding to any values which are to be loaded from said physical memory locations; and a circuit for comparing each address alias for all memory addresses corresponding to any values which are to be stored in said physical memory locations with the contents of said buffer.

* * * * *